Jan. 21, 1969   I. C. MacDOUGALL ET AL   3,422,991
PELLET DISPENSING APPARATUS
Filed April 10, 1967

3,422,991
PELLET DISPENSING APPARATUS
Ian Campbell MacDougall, Bridge-of-Allan, and John Logan Taylor, Bainsford, Falkirk, Scotland, assignor to Allied Ironfounders Limited, London, England, a British company
Filed Apr. 10, 1967, Ser. No. 629,804
Claims priority, application Great Britain, Apr. 14, 1966, 16,363/66
U.S. Cl. 221—232    3 Claims
Int. Cl. B65h *5/00, 3/00;* B65g *59/00*

ABSTRACT OF THE DISCLOSURE

Dispensing apparatus for heat accumulative pellets comprising a hollow column which receives a stack of pellets urged to the top of the column by a spring and a pivoted ejector head for dispensing pellets from the top of the stack in succession, the ejector head having a recess on its underside and an opening through which the uppermost pellet is ejected on horizontal movement of the head from one stop position to another.

---

This invention relates to pellet dispensing apparatus and in this specification the word "pellet" means a heat accumulative disc or ring-like element maintained at a predetermined temeprature for use in hot-plates or containers, insulated or non-insulated, for stabilising the temperature of foodstuffs to enable meals to be served in a fresh and palatable condition, for instance, in hospitals, hotels and other catering establishments.

Pellet dispensing apparatus already known basically includes a heated, vertically extending, hollow column for the reception of a stack of pellets, the stack being spring loaded towards the top of the column and means at the top of the column for individually dispensing pellets in succession from the stack into hot plates. Such prior apparatus and, in particular, the means for dispensing the pellets individually, has been complicated with consequent high production costs and difficulties in maintenance and replacement of worn components.

It is the main object of this invention to provide pellet dispensing apparatus which is simple in construction compared with hitherto known aparatus for this purpose.

According to the present invention there is provided pellet dispensing apparatus, including a vertical hollow column for the reception of a stack of pellets, resilient means in the column for urging the stack of pellets towards the top of the column and an ejector head pivotally mounted for movement in a horizontal plane so that in one position a recess in the underside of the head overlies the column and in another position the head is clear of the top of the column for recharging the column with pellets, the head having an opeining which communicates with the recess, through which opening the pellets may be ejected horizontally in succession by movement of the head from said one position to a further position in which the stack of pellets is retained within the column until the head is returned to said one position. The recess is preferably defined by members downwardly projecting from the underside of said ejector head in the form of ribs, there being ribs of different depth so that the uppermost pellet in the stack is retained at the correct level for dispensing and, when the uppermost pellet is being dispensed, the next uppermost pellet is prevented from upward movement by other ribs until the recess has been returned to cover the column.

One embodiment of pellet dispensing apparatus constructed in accordance with the invention will now be described, by way of example only, and with reference to the accompanying drawings, in which.

Figure 3:
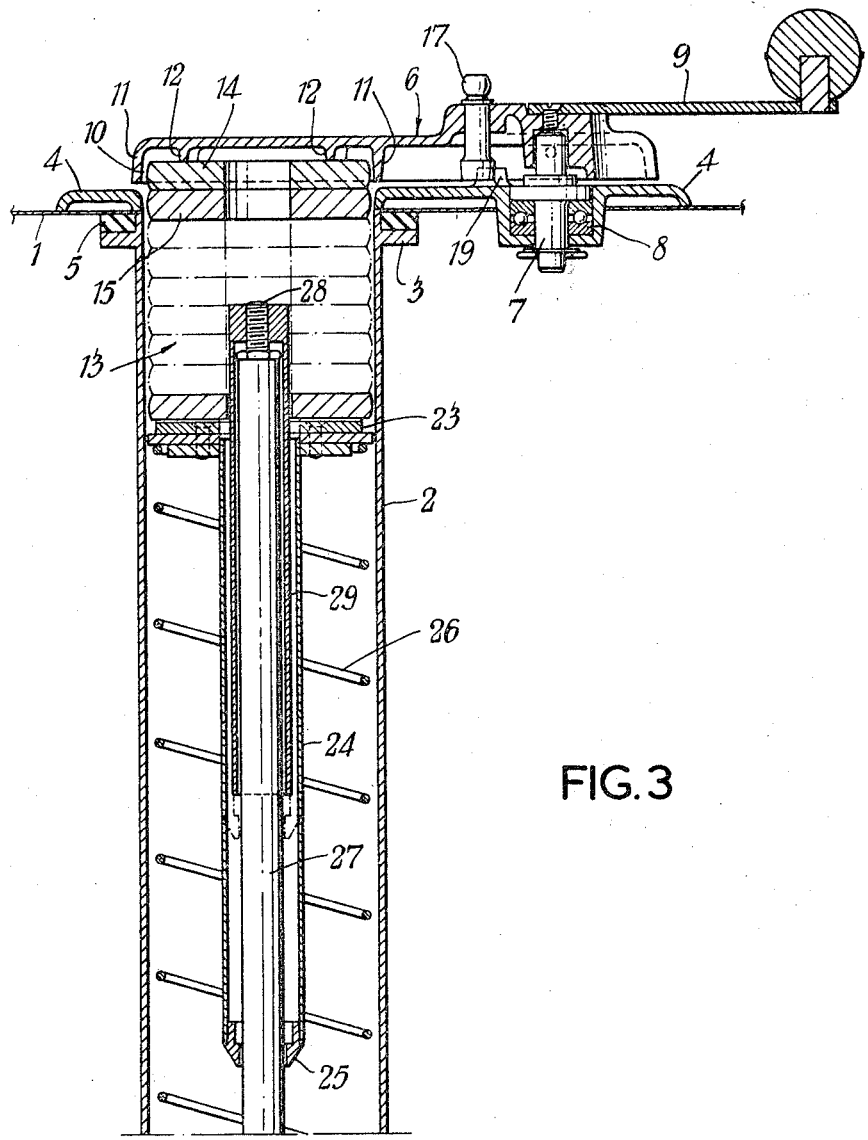
FIG. 3 is a cross-sectional view on the line III—III of FIG. 2.

The pellet dispensing apparatus illustrated in the drawings includes a housing 1 within which is situated any known type of heating means, for example, electrical coils (not shown) which surround a hollow column 2 illustrated in FIG. 3. This column 2 has a flange 3 near its upper end and bears against the underside of a base plate 4 which is attached to the top of the housing 1. Between the flange 3 and the underside of the top of the housing 1 is an insulation ring 5. An ejector head 6 is pivotally mounted for movement in a horizontal plane by pivot shaft 7 carried by bearing assembly 8 and the ejector head 6 is provided with an operating handle 9. The ejector head 6 has, on its underside, a recess 10 which is defined by deep ribs 11 and shallow ribs 12. In one position of the ejector head 6 the recess 10 overlies the column 2 which receives a stack 13 of pellets. As will be seen from FIG. 3, the uppermost pellet 14 in the stack 13 lies within the recess 10 whereas the next uppermost pellet 15 in the stack 13 is held, by the uppermost pellet 14, with its upper surface level with the upper surface of base plate 4. The ejector head 6 has an opening 16 which communicates with the recess 10 through which opening pellets may be dispensed in succession as described hereinafter.

Figure 1:
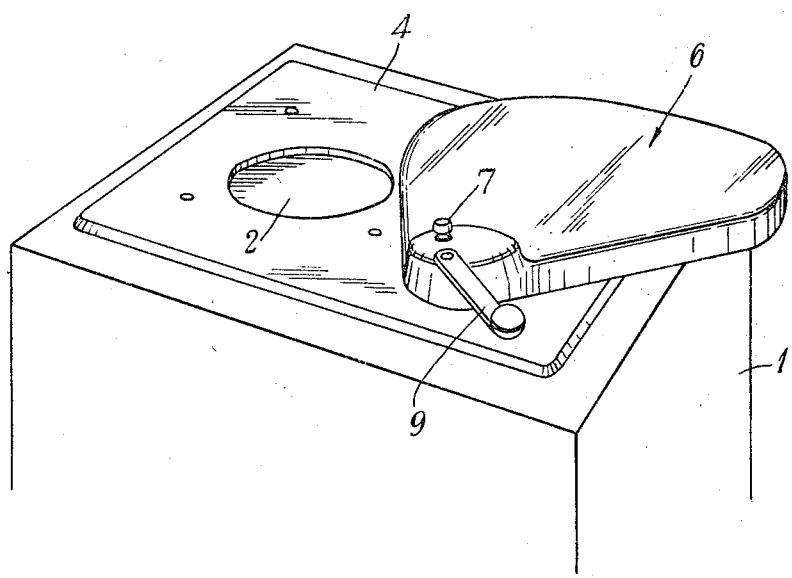
FIG. 1 is a perspective view of the top of apparatus in accordance with the invention.
Figure 6:
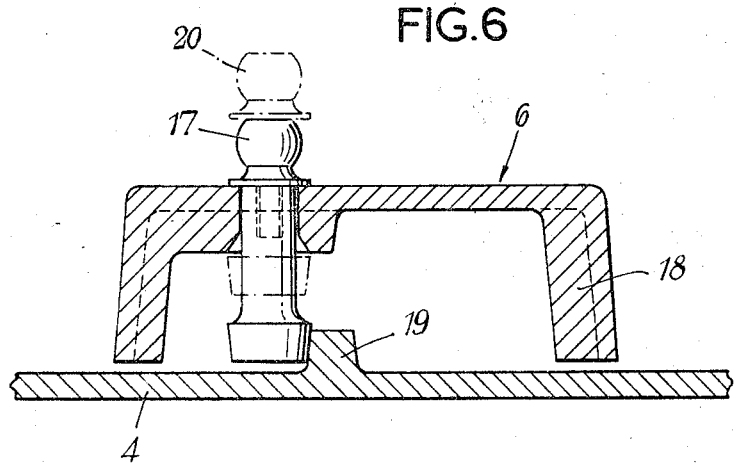
FIG. 6 is a cross-sectional view on the line VI–VI of FIG. 2.

The ejector head 6 is provided with two stops 17 and 18 and the base plate 4 is provided with a further stop 19. These three stops 17, 18 and 19 are located at equal distances from the axis of shaft 7 whereby, on rotation of the ejector head in a horizontal plane, the stops 17 and 18 may contact stop 19. The stop 17, as clearly shown in FIG. 6, is capable of being manually raised against gravity to the position indicated in dotted lines at 20 so that the base part of the stop 17 is clear of the stop 19.

Figure 2:
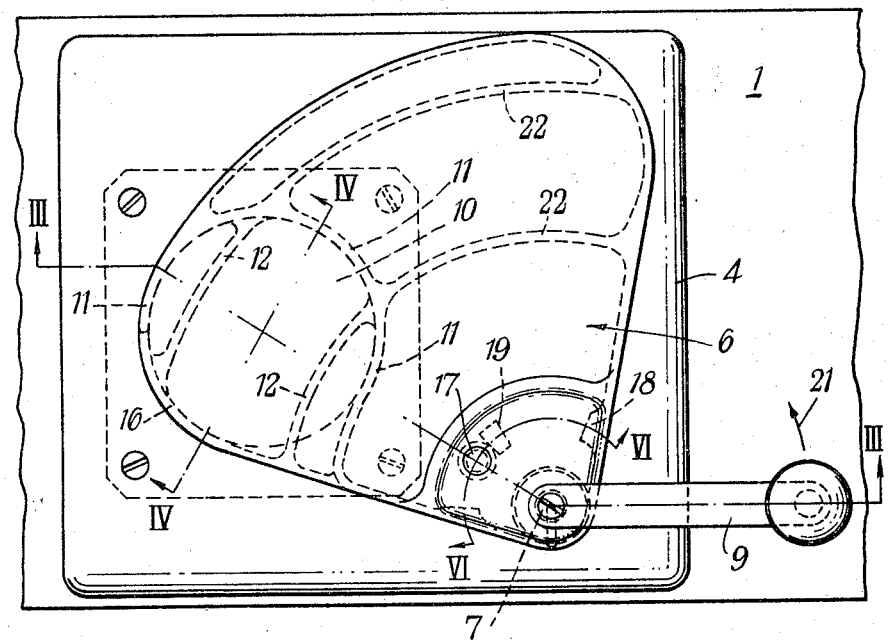
FIG. 2 is a plan view of the apparatus illustrated in FIG. 1 with the ejector head in an alternative position.
Figure 4:
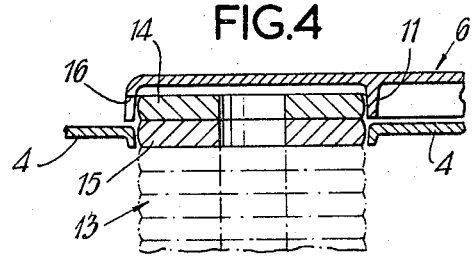
FIG. 4 is a cross-sectional view on the line IV—IV of FIG. 2.
Figure 5:
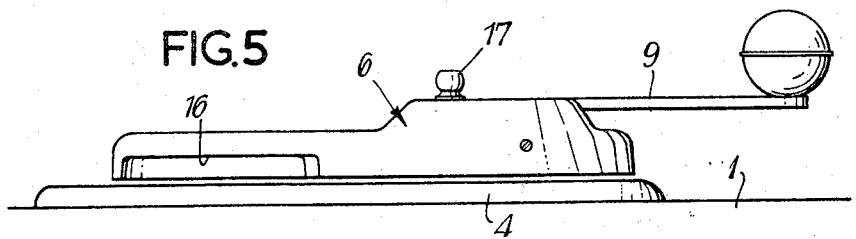
FIG. 5 is a part side elevation of the apparatus illustrated in FIG. 2.

As will be appreciated, during dispensing of pellets from the apparatus, the stop 19 lies between stops 17 and 18 as indicated in FIG. 2. With the stop 17 against the stop 19 the recess 10 overlies the stack 13 of pellets with the uppermost pellet 14 within the recess 10. By a sharp movement of the handle 9 in the direction of arrow 21, as indicated in FIG. 2, the ejector head 6 will rotate about shaft 7 until the stop 18 contacts stop 19. The rotation of ejector head 6 will then be suddenly interrupted and the momentum of the uppermost pellet 14 will cause this pellet 14 to be ejected through the opening 16 and into a hotplate or container which has been suitably positioned to receive the pellet. During this operation, as soon as the uppermost pellet 14 has moved clear of the stack 13 of pellets, the next uppermost pellet 15 will be held against any substantial upward movement by the provision of further ribs 22 on the underside of ejection head 6. When the ejector head is returned to the position illustrated in FIG. 2, the next uppermost pellet 15 will be automatically moved into the recess 10 ready for dispensing.

The recess 10 may have an insulating pad therein for retaining the heat within the uppermost pellet.

The stack 13 of pellets rests, when in the column 2, on a loading platform 23 to which is fixed a sleeve 24 having at its lower end means which project therefrom in the form of a ferrule 25. The loading platform and the sleeve 24 are urged vertically upwards by any form of resilient means which, in this embodiment, is a spring 26. Fixed to the base of the housing 1 and extending vertically upwards therefrom is a cylindrical member 27 which comprises a thermostat with a protecting sleeve around it and this thermostat controls the temperature of the heating elements previously referred to. At the upper end of the cylindrical member 27 is a screw-threaded nipple 28 on which is screw-threaded a stop tube 29.

As will be appreciated from FIG. 3, the engagement of the ferrule 25 with the bottom end of stop tube 29 limits the upward movement of the loading platform 23 so that when the stack 13 of pellets has been exhausted, the loading platform 23 itself does not enter the recess 10. The screw-threaded engagement between the nipple 28 and the upper end of stop tube 29 gives a fine adjustment for the upward travel of the loading platform 23.

It will be understood that the invention is not limited to the particular embodiment hereinbefore described but only by the scope of the appended claims, for example, the apparatus may include several columns each with its own stack of pellets and each with its own ejector head.

We claim:

1. Pellet dispensing apparatus including a housing, a vertically disposed hollow column for the reception of a stack of pellets within the housing and resilient means within the column for urging the stack of pellets towards the top of the column, the improvement comprising an ejector head pivotally mounted on the housing near to the top of the column for movement in a horizontal plane from one position of the head in which a recess in the underside of the head overlies the column to another position in which the head is clear of the top of the column for recharging the column with pellets, the said head having an opening which communicates with the said recess through which opening pellets may be ejected horizontally in succession by movement of the said head from said one position to a further position in which the stack of pellets are retained within the column until the head is returned to said one position, said recess being defined by a plurality of downwardly projecting members of different depth on the underside of ejection head, whereby the uppermost pellet in the stack is retained by one of said members at the correct level for dispensing whilst other members on the ejector head, when the uppermost pellet is being dispensed, prevent the next uppermost pellet from upward movement until the said recess is returned to said one position.

2. Pellet dispensing apparatus as claimed in claim 1, which further comprises:
   a loading platform within said column and resting on said resilient means for the support of said stack of pellets;
   a sleeve fixed to said loading platform and extending downwardly therefrom axially within the said column;
   stop means projecting from the lower end of said sleeve;
   a cylindrical member fixed to said housing and extending upwardly from the bottom of and within the column and sleeve; and
   a stop tube carried by and surrounding part of said cylindrical member,
   whereby upward movement of said loading platform is limited by engagement of the lower end of said stop tube by said stop means projecting from the lower end of said sleeve.

3. Pellet dispensing apparatus as claimed in claim 2, wherein the improvement further comprises a screw-threaded nipple mounted at the upper end of said cylindrical member, said stop tube having a screw-threaded hole which receives, in screw-threaded engagement, the said nipple, whereby fine adjustment is provided for limiting the upward movement of said loading platform by rotating said stop tube on said nipple.

References Cited

UNITED STATES PATENTS

| | | | |
|---|---|---|---|
| 977,583 | 12/1910 | Beardsley | 221—232 |
| 2,705,576 | 4/1955 | Amelio et al. | 221—256 |
| 3,055,547 | 9/1962 | Radcliffe et al. | 221—150 |

WALTER SOBIN, *Primary Examiner.*

U.S. Cl. X.R.

221—150, 256